United States Patent
Espinoza-Ibarra et al.

(10) Patent No.: US 7,185,214 B2
(45) Date of Patent: Feb. 27, 2007

(54) SYSTEM AND METHOD FOR LOAD DEPENDENT FREQUENCY AND PERFORMANCE MODULATION IN BLADED SYSTEMS

(75) Inventors: Ricardo Espinoza-Ibarra, Carmichael, CA (US); Andrew H. Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 10/216,234

(22) Filed: Aug. 12, 2002

(65) Prior Publication Data

US 2004/0030774 A1    Feb. 12, 2004

(51) Int. Cl.
*G06F 1/26*    (2006.01)
(52) U.S. Cl. ...................... 713/320; 709/224
(58) Field of Classification Search ................ 713/320; 709/224
See application file for complete search history.

(56) References Cited

U.S. PATENT DOCUMENTS 5,724,591 A    3/1998    Hara et al.
6,795,928 B2 *    9/2004    Bradley et al. ............. 713/320
6,859,882 B2 *    2/2005    Fung ........................... 713/300
6,901,522 B2 *    5/2005    Buch ........................... 713/320
6,952,659 B2 *    10/2005    King et al. .................. 702/186

FOREIGN PATENT DOCUMENTS

WO    WO 96/30832    10/1996

OTHER PUBLICATIONS

E. Elnozahy, M. Kistler, and R. Rajamony. Energy-efficient server clusters. In Proceedings of the Second Workshop on Power-Aware Computing Systems, Feb. 2, 2002 (held in conjunction with HPCA-2002).*
Search Report issued on Jan. 29, 2004 in counterpart foreign application in GB under application No. 315107.3.
Sun Blade 100 Service Manual:- Functional Description—URL: http://docs.sun.com/source/805-4496-10/appC.htm—(c)    Sun Microsystems Inc. 2000, see p. 34.

* cited by examiner

*Primary Examiner*—Chun Cao
*Assistant Examiner*—Albert Wang

(57) ABSTRACT

In a blade-based computer system, the number of loaded blades in the system is determined. Next, an optimal performance configuration for each of the individual blades is determined. The optimal performance configuration is based at least in part on the number of the blades loaded in the chassis and the overall thermal and power envelope. Then an individual frequency for at least one of said individual blades is set creating a more efficiently run system.

13 Claims, 6 Drawing Sheets

800

900

SYSTEM AND METHOD FOR LOAD DEPENDENT FREQUENCY AND PERFORMANCE MODULATION IN BLADED SYSTEMS

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,438, entitled "SYSTEM AND METHOD FOR THE FREQUENCY MANAGEMENT OF COMPUTER SYSTEMS TO ALLOW CAPACITY ON DEMAND" to Andrew H. BARR, et al.; U.S. patent application Ser. No. 10/216,283, entitled "SYSTEM, METHOD AND APPARATUS FOR PERFORMANCE OPTIMIZATION AT THE PROCESSOR LEVEL" to Ricardo ESPINOZA-IBARRA, et al.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286, entitled "VOLTAGE MODULATION IN CONJUNCTION WITH PERFORMANCE OPTIMIZATION AT PROCESSOR LEVEL" to Andrew H. BARR, et al.; U.S. patent application Ser. No. 10/216,285, entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,229, entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" to Andrew H. BARR, et al.; U.S. patent application Ser. No. 10/216,232, entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435, entitled "MANAGEMENT OF A MEMORY SUBSYSTEM" to Andrew H. BARR, et al., all of which are concurrently herewith being filed under separate covers, the subject matters of which are herein incorporated by reference.

BACKGROUND

Bladed servers, or bladed computer systems, are computing systems that provision servers or other computer resources on individual cards, or blades. There are many types of blades—server blades, storage blades, network blades, etc.—and one or more of each type of blade is typically hosted together in a single structure, thus creating high-density computing systems with modular architectures, ensuring flexibility and scalability of the systems, and reducing space requirements. Server blades, along with storage, networking, and other blades, are typically installed in a rack-mountable enclosure, or chassis, which hosts multiple blades. The multiple blades share common resources such as cabling, power supplies, and cooling fans.

The telecommunications industry has been using blade server technology for many years. More generally, the condensed blade server architecture benefits people and businesses that: (1) use the Internet to generate revenue and to provide services to customers; (2) are moving some of their business processes to the Web; and/or (3) need the flexibility to deploy Internet-edge applications in their own data center. Because of recent developments in technology, blade servers are now used for applications such as Web hosting, Web caching, and content streaming.

In Web caching applications, frequently-requested Web content is stored closer to the user, thus allowing for quicker retrieval of objects by the user and reducing the time and bandwidth required to access the Internet. Since companies and individuals are now streaming media (e.g., video and audio) to more effectively communicate both internally and externally, a massive growth of rich media content delivery on the Internet has occurred. Bladed servers are being used to meet the new demands created as a result of this growth.

Though bladed servers provide many advantages, several engineering challenges arise when using bladed servers. Among these challenges is the challenge of designing and operating a bladed system such that sufficient heat is dissipated in the limited space available in the chassis that hosts the system. To address heat dissipation challenges, bladed server systems are designed within an underlying power and thermal envelope. For example, when a chassis that hosts a bladed system has a limited amount of airflow available to cool the blades (i.e., when the system can only dissipate a limited amount of heat), then the chassis is designed for a limited amount of power consumption and an associated limited performance of the respective blades. Some known power limiting strategies include powering down a CPU functional unit, e.g., a floating-point unit or an on-die cache, or trading off speed for reduced power consumption in a hard drive.

Prior solutions for bladed systems have included, running the blades at a lower than optimal frequency, loading only one blade or one type of blade in the system, limiting the combination of blades the system can handle at a time, using expensive infrastructure to ensure adequate ventilation and power delivery to the system, and ignoring system specifications and run at high risk of system failure.

SUMMARY

In one embodiment of the system and method for managing the operating frequency of blades in a blade-based computer system, the number of loaded blades in the system is determined. Next, an optimal performance configuration for each of the individual blades is determined. The optimal performance configuration is based at least in part on the number of the blades loaded in the chassis and the overall thermal and power envelope. Then an individual frequency for at least one of said individual blades is set.

In another embodiment of the system and method for managing the operating frequency of blades in a blade-based computer system, a means for determining the number of loaded blades in the chassis of the blade-based computer system is used to determine the number of blades in use. Next, a means is used to determine an optimal performance configuration for each of the individual blades. The determination is based at least in part on the number of blades loaded in the chassis and the overall thermal and power envelope. Then, a means for setting an individual frequency is used to adjust the frequency for at least one of the individual blades.

In another embodiment of the system and method for managing the operating frequency of blades in a blade-based computer system, a management blade for determining the number of loaded blades in the chassis of the blade-based computer system is programmed to determine an optimal performance configuration for each of the individual blades based at least in part on the number of the blades loaded in the chassis and the overall thermal and power envelope. A device is used to set an individual frequency for at least one of the blades.

DESCRIPTION OF THE DRAWINGS

The detailed description will refer to the following drawings, wherein like numerals refer to like elements, and wherein.

DETAILED DESCRIPTION

Figure 1:
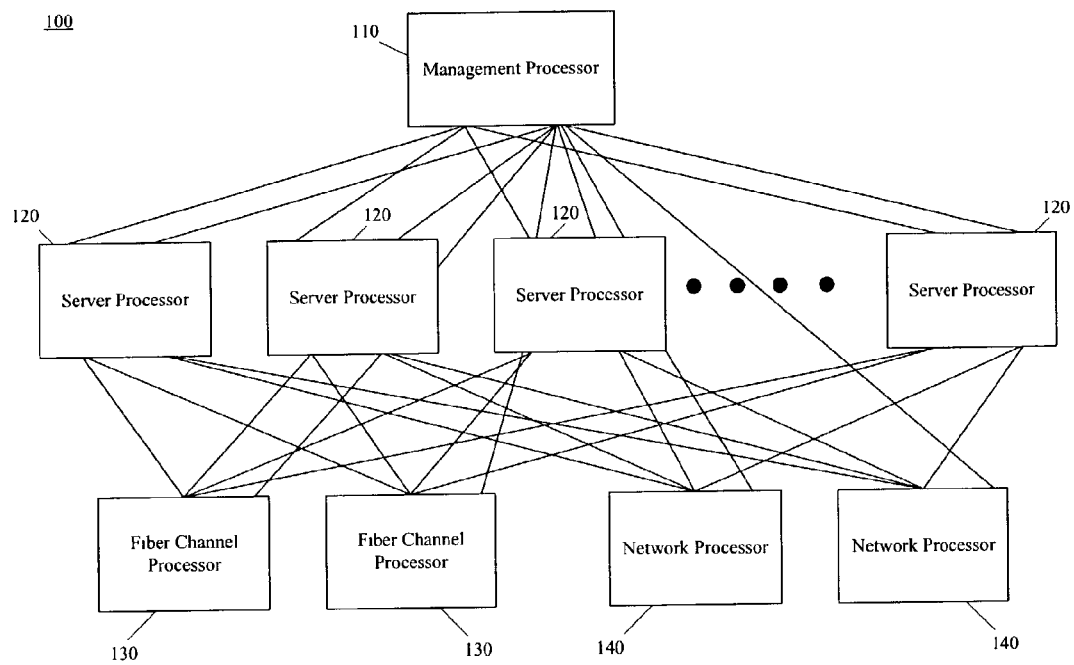
FIG. 1 shows a block diagram depicting one embodiment of the basic modular building blocks of a bladed architecture system.

Some preferred embodiments of the method for frequency and performance modulation in bladed systems will now be described in detail with reference to the following figures. With reference to FIG. 1 of the Drawings, there is illustrated therein a block diagram depicting one embodiment of the basic modular building blocks of a bladed computer system architecture, as generally designated by the reference numeral 100. A management blade 110 supervises the functions of the chassis and provides a single interface to the consoles of all the server blades 120 installed.

As shown in FIG. 1, server blades 120 may be operably connected to and may be in communication with the management blade 110. The server blades 120 may, in turn, be operably connected to and may be in communication with other blades that perform specific functions. For example, as seen in FIG. 1, the server blades 120 may be in communication with fiber channel blades 130 and network blades 140.

The bladed system can also detect the presence and/or identify the loading of one or more individual blades in the chassis. Although many method exist that allow for the detection and/or identification of the individual blades, the serial presence detect (SPD) mechanism is often chosen. According to this mechanism, when a computer system is booted, the blades may be properly configured for maximum reliability and performance using information about that blades' size, data width, speed, and voltage. This information may be stored in an electrically erasable programmable read-only memory (EEPROM).

Implementation of the SPD mechanism may be through an $I^2C$-based Intelligent Platform Management Bus (IPBM) interface. Such an interface generally provides a bi-directional communication link and a way to communicate with "intelligent" hardware that can monitor and control system health and performance. However, other ways of implementing the SPD mechanism will be apparent to one skilled in the art.

Once all of the blades in a chassis are identified, the optimal performance configuration for each of the individual blades or processors in the chassis is determined. The determination of the optimal performance configuration may be based on the number of blades that are in use or loaded in the system.

For example, in a ten-blade system the system may, through automatic detection or through a manual interface, recognize that there are only five blades loaded. Thus, only half of the total power and thermal budget is consumed. To compensate for this disproportionate and inefficient power allocation, the system may create more optimal performance by increasing the frequency of the blades.

Following the determination of the optimal performance configuration, information about the determined optimal performance configuration for each of the individual processors or blades may be provided to a Guardian Service Processor (GSP) service manager. The GSP may be built into a PA blade in the chassis and may then keep the information in RAM, communicate with the blades in the chassis, and/or manage serial ports, LAN ports, modem ports, etc. The information may be provided to the GSP through an $I^2C$ IPMB, a Local Area Network (LAN), etc.

Before communicating with the blades, the GSP may be used to process the information about the optimal performance configuration that was determined within the GSP according to the paragraph above. The information is then communicated to the processors, blades, or other components of the computer system in a format that allows for the processors, blades, or other components to be controlled.

In a chassis the thermal and power budget allocated to each blade may be designated as M. If the chassis is only populated by one server-blade, the power and thermal budget allocated to that blade will be larger than if the chassis was populated by N blades by (approximately) $M*(N-1)$. Therefore, that server-blade may be run at a much higher frequency than under nominal settings. As new blades are added to the chassis, the factor $M*(N-1)$ will be decreased in an approximately linear relationship. The frequency of the blade can be changed to allow the blade to operate at optimal performance and fall within the allocated power and thermal budget of the chassis. Thus, modification of the frequency at which each individual blade operates is made dependent on the number of loaded blades in the chassis.

More specifically, the individual frequency for one or more of the individual processors or blades within the chassis may be set using the information processed within the GSP. The setting of the frequencies for the individual blades may be done using a number of devices such as, but not limited to, manual configuration devices, dip switches, resistor jumpers, microcontrollers/microprocessors, field-programmable gate arrays (FPGA), programmable logic devices (PLD), and/or I2C-based I/O-expander chips, as will be discussed below and shown in the attached figures.

As discussed above, it is desirous to create a bladed architecture system in which it is possible to adjust the frequency of the blades individually based upon the loading of those blades. FIGS. 2–7 illustrate various methods for manually managing the operating frequency of the various blades in the system. In the embodiments illustrated in FIGS. 2–6, the processor core frequency of the CPU is asynchronous to the bus operating frequency. Therefore, a change to the processor core frequency can be made independently of the system bus frequency.

Currently, Hewlett Packard uses the SPHYR-T ASIC as the preferred frequency-synthesizer for generating the processor clock of the PA-RISC systems. However, one skilled in the art would readily recognize that other synthesizers may also be used. Generally, frequency synthesizer chips used to generate the processors' clocks have parallel or serialized configuration bits that allow one to choose the ratio of the input clock to the output clock (synthesized frequency). This allows one to run the processors at a different frequency upon reboot of the blade. The frequency synthesizer typically has an input frequency from a core crystal. Through controlling the serial or parallel pins it provides the output frequency ratio that is sent to the processors. One skilled in the art would also appreciate that if multiple frequency synthesizers are utilized, i.e., two (for a 2-way system) or N (for an N-way system), to generate the processor's clocks, the processors are able to operate at different frequencies within the range of frequencies supported by the processor. FIGS. 2–6 illustrate different methodologies of how the ratio pins of the different frequency synthesizers can be controlled.

Figure 2:
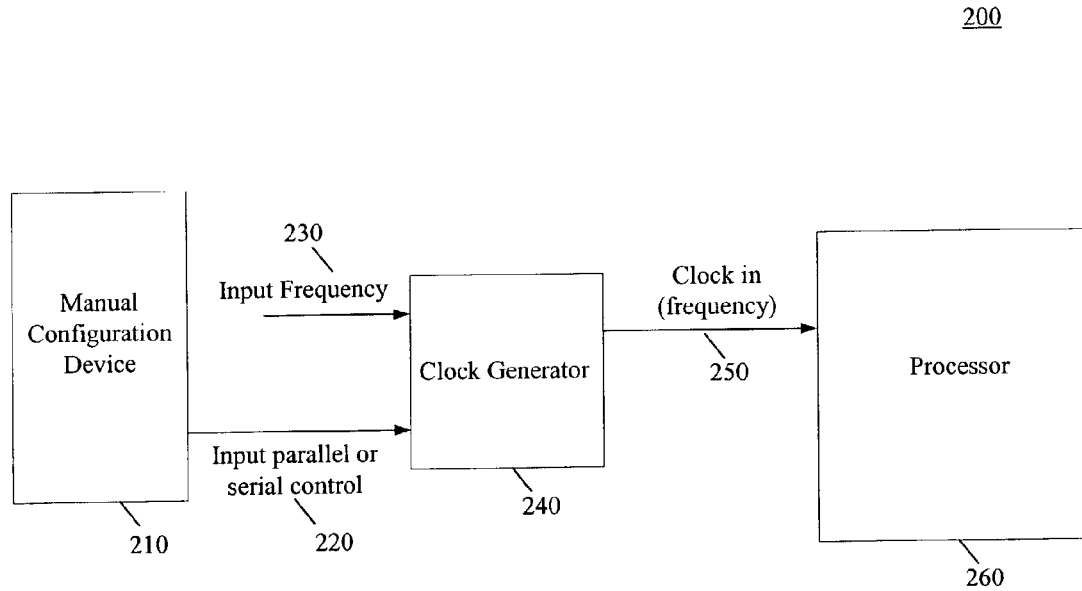
FIG. 2 illustrates a block diagram depicting one methodology of managing the operating frequency of individual blades by use of a manual configuration device.

With reference now to FIG. 2 of the Drawings, there is illustrated therein a block diagram, as generally designated by the reference numeral 200, depicting one methodology of managing the operating frequency of individual blades by use of a manual configuration device 210. One of ordinary skill in the art would recognize that there are many common manual configuration devices that are capable of performing the desired function, e.g., dip switches, jumpers installed over pin headers, rotational configuration switches, and solder bridges, etc. As seen in FIG. 2, the manual configuration device 210 is added to a readily accessible part of the bladed computer system. The input frequency 230 and signal 220 from the manual configuration device 210 may be used to generate an output frequency 250 at the clock generator 240 that is used by blade 260. It is to be appreciated that the above described method of changing the frequency of the blades may be applied to various types of processor architectures, e.g., DEC Alpha, MIPS, PowerPC, SPARC, IA-32 and IA-64, etc.

Figure 3:
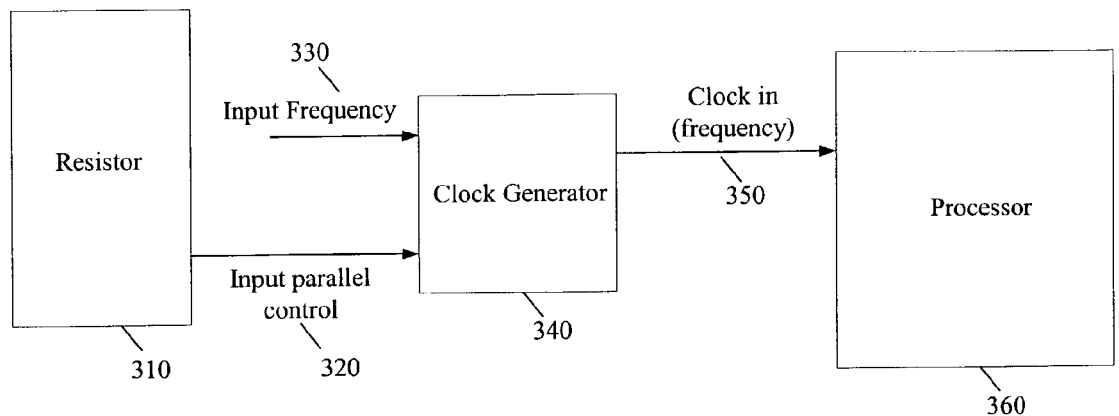
FIG. 3 illustrates a block diagram depicting another method of managing the operating frequency of individual blades by use of resistors.

With reference now to FIG. 3 of the Drawings, there is illustrated therein a block diagram 300 depicting another method of managing the operating frequency of individual blades. According to the method illustrated by block diagram 300, the operating frequency of individual blades may be managed by use of resistor jumpers 310. As seen in FIG. 3, the resistor jumpers 310 may be added to a readily accessible part of the computer system. An input frequency 330 and signal 320 from the resistor jumpers 310 may be used to generate an output frequency 350 at a clock generator 340 that is used by blade 360. As with the method described above in FIG. 2, this method of changing the frequency of the processor or blade via the use of resistor jumpers may be applied to various types of processor architectures.

Figure 4:
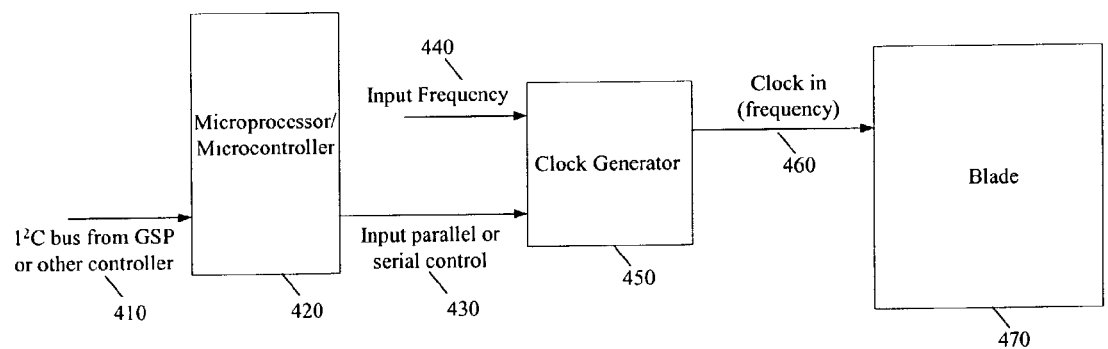
FIG. 4 illustrates a block diagram depicting another method of managing the operating frequency of individual blades by use of a microcontroller or microprocessor.

With reference now to FIG. 4 of the Drawings, there is illustrated therein a block diagram 400 depicting the method of managing the operating frequency of individual blades by use of a microcontroller or microprocessor 420. The microcontroller or microprocessor 420 may be used to interface with a GSP to ask for the specific frequency at which each blade should operate or run. As seen in FIG. 4, the microcontroller or microprocessor 420 may receive a signal from an I²C bus 410 from a GSP (Guardian Service Processor) or other controller. A person of ordinary skill in the art would readily recognize that other control buses could perform the same functions and be substituted for the I²C bus described herein. The microcontroller or microprocessor 420 may then output a parallel or serial control 430, based upon the specific frequency designated by the GSP. A clock generator 450 may then use an input frequency and parallel or serial control signal 430 to generate an output frequency 460 used by blade 470. The use of the microcontroller or microprocessor 420 allows the GSP to control the frequency synthesizers in a more transparent way than the above-described register and manual configuration device methods, (i.e., it is not necessarily need to know how the settings of the configuration bits will affect the output).

Figure 5:
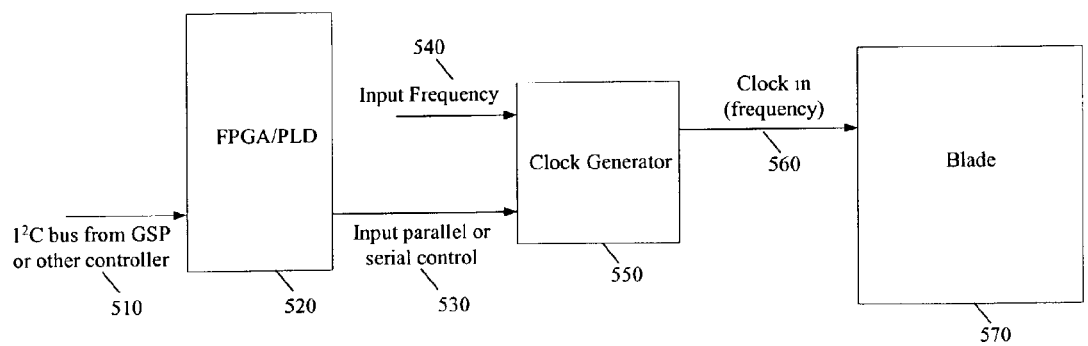
FIG. 5 illustrates a block diagram depicting another method of managing the operating frequency of individual blades by use of a FPGA or PLD.

With reference now to FIG. 5 of the Drawings, there is illustrated therein a block diagram 500 depicting the method of managing the operating frequency of individual blades by use of a FPGA or PLD 520. As is known to those skilled in the art, an FPGA is a chip that can be programmed in the field after manufacture. The FPGA or PLD 520 may be used to receive commands from a higher-level device, such as the GSP, via an I²C bus 510, and to control the configuration bits for the frequency synthesizer (or each synthesizer). As seen in FIG. 5, a clock generator 550, may use an input frequency 540 and control signal 530 from the FPGA/PLD 530 to generate an output frequency 560 used by blade 570. Like the use of the microcontroller/microprocessor 420 described in FIG. 4, the FPGA/PLD 520 allows the GSP to control the frequency synthesizers in a more transparent way (i.e., it is not necessarily to know how the settings of the configuration bits will affect the output).

Figure 6:
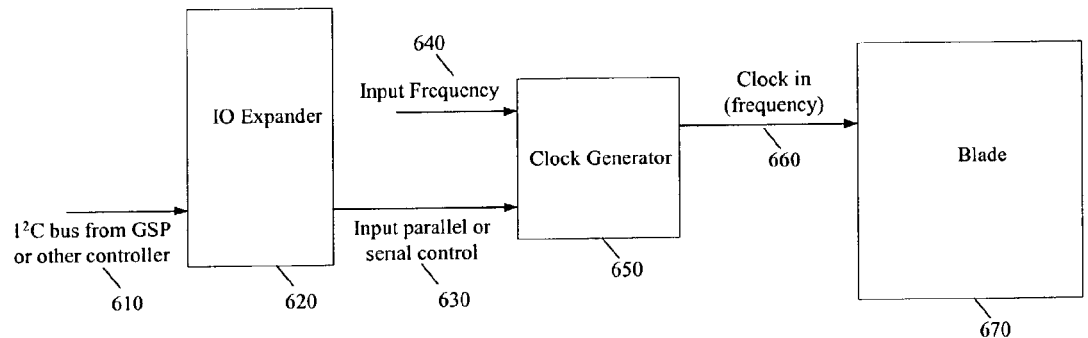
FIG. 6 illustrates a block diagram depicting another method of managing the operating frequency of individual blades by use of an I/O-Expander chip (I/OX).

With reference now to FIG. 6 of the Drawings, there is illustrated therein a block diagram 600 depicting the method of managing the operating frequency of individual blades by use of an I²C-based I/O-expander chip (I/OX) 620. As known in the art, an I²C-based I/OX 620 is an inexpensive and simple solution that can be used to transparently control each frequency synthesizer. I/OX chips 620 have I/O ports, which can be forced to a particular state by writing to the I/OX through an I²C command. Since I/OX typically have multiple I/O ports, one I/OX can be used to control multiple frequency synthesizers individually.

Since I/OX chips are I²C-based, they can be controlled by any device that supports an I²C interface. In Hewlett Packard's PA-RISC Blades, such a logical device could be the service processor, or GSP, of the PA Blade. The user-friendly interface of the GSP may be used to transparently allow the customer to manually control the frequency of the processors or blades without need of any low-level information (e.g., bit-settings). The input from the GSP is designated in FIG. 6 by reference numeral 610. The user at the GSP inputs commands to increase the frequency of the processor. The GSP then delivers the required bits to change the ratio of the frequency generator, so that the processor will run at the desired level. The bit stream 610 is received by the I/OX

620. A clock generator 650 then uses an input frequency 640 and a control signal 630 to generate an output frequency 660 used by a processor or blade 670.

Turning the discussion away from the specific devices that may be used to set the frequencies of the individual blades and returning to the general method for managing the performance of a bladed computer system, it is possible to allow for the setting of individual frequencies for one or more of the individual blades in the chassis to be disabled. In other words, a system user may choose to prevent the GSP from being able to change the frequency of one or more of the blades in the chassis.

In order to disable the setting of the individual frequency for at least one of the blades, a flag may be provided in the GSP Non-Volatile Random Access Memory (NVRAM). A backup of the flag may also be provided in a platform dependent hardware (PDH) register. The flag, or the backup of the flag, may be used to enable and/or disable setting of the individual frequency for at least one of the individual blades. According to certain embodiments, the flag may be used to enable/disable setting of the individual frequency for several or even all of the blades in the system.

Another alternative for enabling and disabling the setting of the individual frequency for at least one of the individual blades in the chassis includes providing a flag to set for those blades that the user does not wish to have reconfigured. Under such circumstances, the blades may be treated as constants during the power and thermal calculations discussed above if the setting of the individual frequency has been disabled using the flag.

Figure 7:
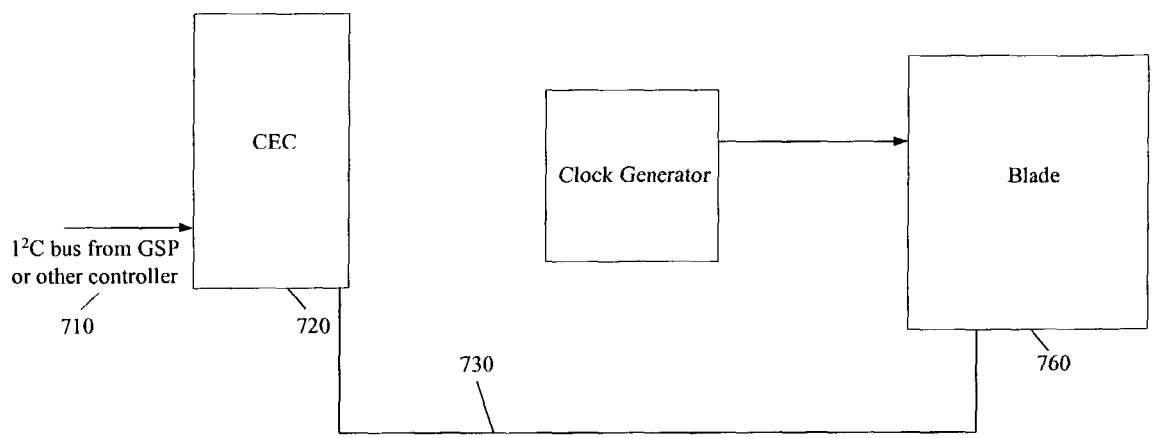
FIG. 7 illustrates a block diagram depicting the methods of managing the operating frequency of individual blades in an IA based architecture system.

With reference now to FIG. 7 of the Drawings, there is illustrated therein a block diagram depicting the methods of managing the operating frequency of individual processors in an IA based architecture system, as generally designated by the reference numeral 700. As shown above, PA-based architectures have two frequency inputs that are taken into the processor: the processor core input and the bus input. In IA-based architectures the serial or parallel control is not modulated. IA-based architectures program the processor core frequency to generate a multiple of the bus frequency. The programming of the processor core frequency is done during early bus initialization using multipurpose bus lines 730. This is typically controlled by the main core chipset that sits on the processor bus (CEC) 720. Generally, a user interface, e.g., a GSP 710, is used to program the CEC 720 to generate the appropriate control signal 730 during early system and bus initialization. The bus frequency is multiplied for a larger ratio to generate a higher frequency, performance and power, or for a smaller ratio to generate a lower frequency, performance and power, depending on the application at the particular processor 760.

Figure 8:
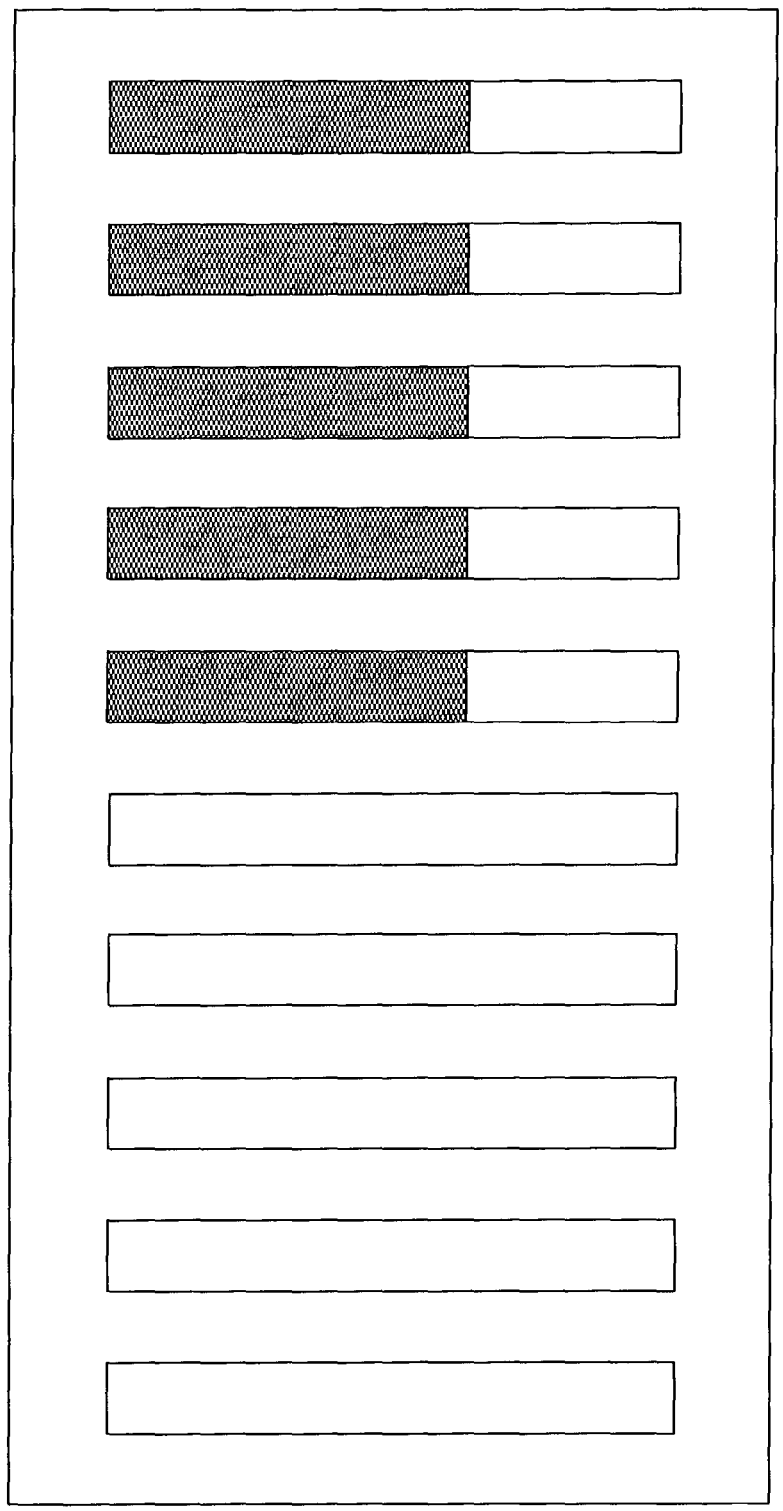
FIG. 8 illustrates a block diagram depicting a series of blades inside of a bladed architecture chassis where only five of the ten blades are loaded and running at a frequency level less than optimal.

With reference now to FIG. 8 of the Drawings, there is illustrated therein a block diagram 800 depicting a series of blades inside of a bladed architecture chassis. As illustrated in the FIGURE, only five out of the ten blades are loaded and those blades are running a frequency that is less than the maximum. As discussed, this is a common method for running or blades in bladed architecture systems to avoid violating the thermal and power envelope dedicated to the system.

Figure 9:
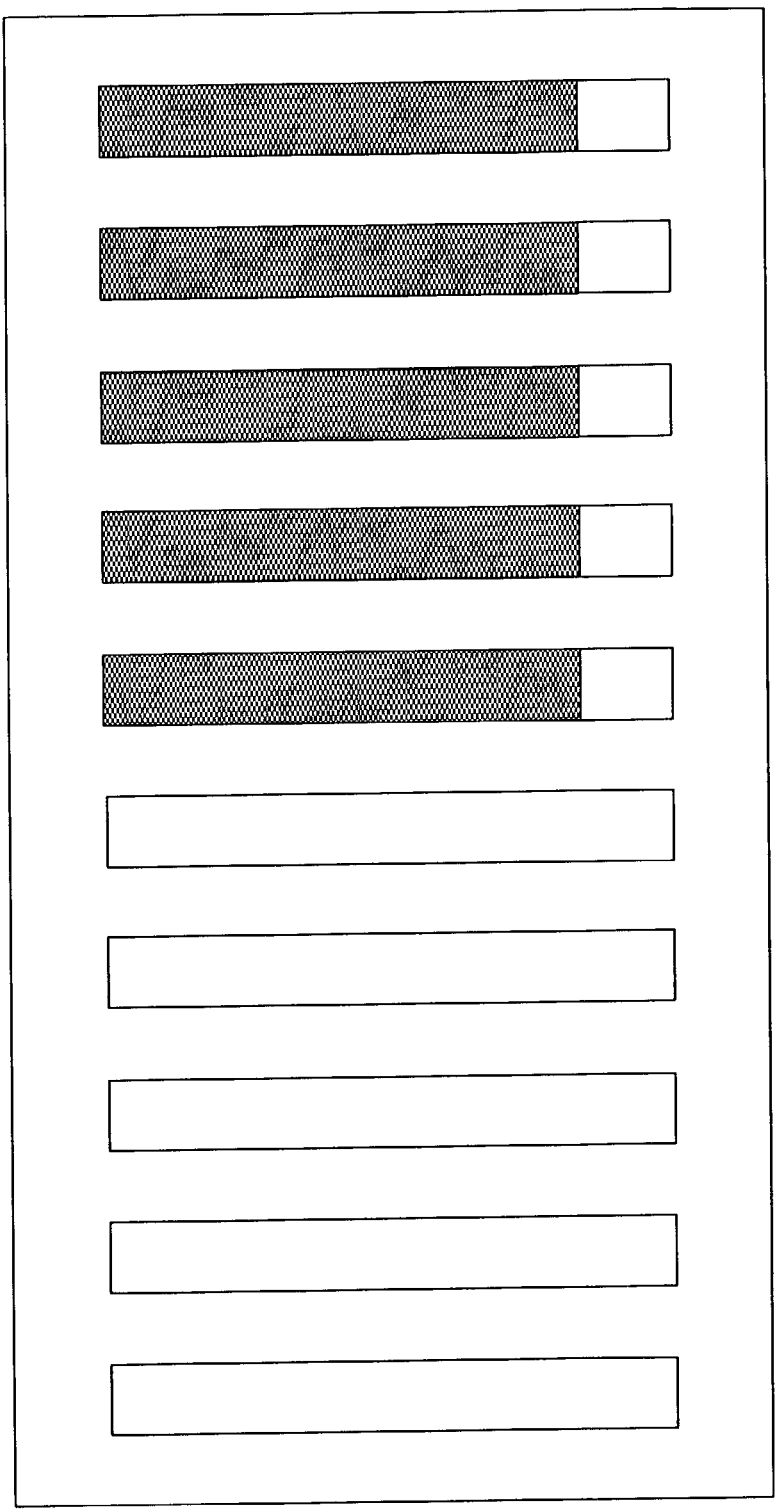
FIG. 9 illustrates a block diagram depicting a series of blades inside of a bladed architecture chassis where the five blades are running at an increased performance level due to the optimization analysis performed by the system.

With reference now to FIG. 9 of the Drawings, there is illustrated therein a block diagram 900 depicting a series of blades inside of a bladed architecture chassis. As illustrated in the FIGURE, the five blades loaded are running at an increased frequency as the loaded blades in FIG. 8. FIG. 9 depicts a system running at an increased efficiency after the system has determined the optimal configuration as described above. Either through automatic detection or through a manual interface, the system determined that only five blades were loaded. Thus, the system is consuming only half of the total power and thermal budget. As a result, the system increased the amount of resources that those blades are consuming to more optimally using their potential performance.

It is to be appreciated that the principles disclosed herein may be applied to a system comprised of processors or blades that share a common chassis or to an architecture system that spans multiple chassis. That is, the principles may be applied to systems that are divided by either a physical or logical partition. For example, physically, a system may include three chassis, with each chassis having eight processors. Logically, the same system could be partitioned into five different web servers for five different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While systems and methods for the method for load dependent frequency and performance modulation in bladed systems has been described in connection with exemplary embodiments, those skilled in the art will understand that many modifications in light of these teaching are possible, and this application is intended to cover any variation thereof.

For example, the disclosed devices and methods makes use of specific frequency synthesizers that are used to manipulate the frequency of various components Other frequency synthesizers could likewise be used. Thus, frequency synthesizers are shown and referenced generally throughout this disclosure, and unless specifically noted, are intended to represent any and all devices/technologies appropriate to perform the desired function. Likewise, there are disclosed several processor architecture types. The specific architecture type is not important to the methods and/or devices described herein. One of ordinary skill in the art would readily realize that the principles described herein may be applied to DEC Alpha, MIPS, PowerPC, SPARC, IA-32 and IA-64 architectures, etc. Thus, it is not applicants' intention to limit the methods and/or devices described herein to any particular form of architecture.

Further examples exist throughout the disclosure, and it is not applicants' intention to exclude from the scope of the methods and/or devices described herein the use of structures, materials, or acts that are not expressly identified in the specification, but nonetheless are capable of performing a claimed function.

The invention claimed is:

1. A method for managing the operating frequency of blades in a blade-based computer system, said method comprising the steps of:

identifying the number of loaded blades in a chassis of said blade-based computer system;

determining an optimal performance configuration for each of the individual blades based at least in part on the number of said blades loaded in said chassis and the overall thermal and power envelope for said blade-based computer system;

setting an individual frequency for at least one of said individual blades in said blade-based computer system; and allowing for the setting of the individual frequency for at least one of said individual blades to be disabled, wherein the allowing step comprises providing a flag in a GSP Non-Volatile Random Access Memory (NVRAM), wherein said flag enables and disables setting of the individual frequency for at least one of said individual blades, wherein the allowing step further comprises providing a backup copy of the flag in a PDH register.

2. The method according to claim 1, wherein said individual frequencies are reset upon a performance requirement change in at least one of said blades.

3. The method according to claim 1, wherein said identifying step comprises using a serial presence detect mechanism.

4. The method according to claim 1, wherein said identifying step comprises using an I2C-based Intelligent Platform Management Bus (IPMB) interface.

5. The method according to claim 1, wherein said determining step comprises basing the determination on currently available thermal and power envelopes.

6. The method according to claim 5, wherein the setting step comprises using a manual configuration device.

7. The method according to claim 5, wherein the setting step comprises using a resistor jumper.

8. The method according to claim 1, wherein said setting step is performed by a user of said blade-based computer system.

9. The method according to claim 1, wherein said setting step is performed by said blade-based computer system.

10. The method according to claim 9, wherein the setting step comprises using a device to set the individual frequency of said blades, said device chosen from the group consisting of: a microcontroller, a microprocessor, a field-programmable gate array (FPGA), a programmable logic device (PLD) and an I2C-based 1/0-expander chip.

11. The method according to claim 1, wherein the allowing step comprises providing a flag at a management blade that may enable and disable setting of the individual frequency for at least one of the individual blades.

12. The method according to claim 1, wherein said blade-based computer system is physically partitioned.

13. The method according to claim 1, wherein said blade-based computer system is logically partitioned.

* * * * *

UNITED STATES PATENT AND TRADEMARK OFFICE
CERTIFICATE OF CORRECTION

PATENT NO. : 7,185,214 B2
APPLICATION NO. : 10/216234
DATED : February 27, 2007
INVENTOR(S) : Ricardo Espinoza-Ibarra et al.

Page 1 of 1

It is certified that error appears in the above-identified patent and that said Letters Patent is hereby corrected as shown below:

In column 9, line 17, in Claim 4, delete "I2C-based" and insert -- $I^2$C-based --, therefor.

In column 10, line 13, in Claim 10, delete "I2C-based 1/0-expander" and insert -- $I^2$C-based I/O-expander --, therefor.

Signed and Sealed this

Twenty-second Day of December, 2009

David J. Kappos
*Director of the United States Patent and Trademark Office*